United States Patent [19]

Harding

[11] 4,326,754
[45] Apr. 27, 1982

[54] VALVE AND ACTUATOR ASSEMBLY FOR RAILROAD CAR AIR BRAKE SYSTEM

[75] Inventor: Bruce L. Harding, Holden, Mass.

[73] Assignee: Smith Valve Corporation, Westboro, Mass.

[21] Appl. No.: 191,829

[22] Filed: Sep. 29, 1980

[51] Int. Cl.³ .............................................. B60T 17/04
[52] U.S. Cl. ........................................ 303/81; 303/86
[58] Field of Search ................... 303/13, 18, 56, 81, 303/86

[56] References Cited

U.S. PATENT DOCUMENTS 3,891,277  6/1975  Cope ................................. 303/18 X
4,153,305  5/1979  Kennedy et al. ..................... 303/81

Primary Examiner—Duane A. Reger
Attorney, Agent, or Firm—Thompson, Birch, Gauthier & Samuels

[57] ABSTRACT

For use in an air brake system for a railroad car having at least three pipe sections, a valve and actuator assembly manually operable from opposite sides of the car for selectively interconnecting the pipe sections, having a valve housing with three ports leading to an interior valve chamber containing a ball element. The ports are adapted for connection to the pipe sections and the ball element is rotatable within the valve chamber about the axis of an operating stem which protrudes to the exterior of the valve housing. The ball element has communicating passages arranged to communicate with the ports in any one of four different combinations depending on the rotative displacement of the ball element. The ports not communicating with ball element passages are closed. An actuator housing is attached to the valve housing and defines an actuator chamber separate from the valve chamber. The actuator housing has an aperture through which the protruding portion of the operating stem is received into the actuator chamber. A rotatable actuator shaft extends through the actuator chamber in a direction perpendicular to the operating stem. A gear connection is provided between the actuator shaft and the operating stem, and the actuator shaft is in turn rotatable from remote locations at opposite sides of the railroad car. The actuator shaft carries a locking element which is engageable with a fixed element on the actuator housing to prevent inadvertent rotation of the actuator shaft from a selected position. The locking element may be disengaged from the fixed element by axially shifting the actuator shaft to thereby permit rotation of the ball element.

7 Claims, 6 Drawing Figures

VALVE AND ACTUATOR ASSEMBLY FOR RAILROAD CAR AIR BRAKE SYSTEM

BACKGROUND OF THE INVENTION

This invention relates to manually operable valves for use in railroad car air brake systems.

Air brake systems for railroad cars include a brake pipe running from one end of the car to the other end, with a branch pipe leading from the brake pipe to a control valve which is in turn connected to other brake components, such as for example the brake cylinders, a compressed air reservoir, etc. It has been conventional practice for many years to provide the brake pipe with manually operable shut off angle cocks at opposite ends of the car, along with a manually operable shut off cock in the branch pipe leading to the control valve. When operating the angle cocks, brakemen must lean over couplings and reach in between cars. This presents operating difficulties and sometimes exposes the brakemen to safety hazards.

In order to avoid these difficulties and hazards, a prior art valve has been proposed for connection at the junction of the branch pipe with the brake pipe. This prior art valve takes the place of the two angle cocks in the brake pipe and the shut off cock in the branch pipe, and it can be operated from opposite sides of the car to interconnect the branch pipe and the two brake pipe sections in various combinations, thereby eliminating the need for brakemen to position themselves in the coupling area between the cars when making such valve adjustments.

Although this prior art represents a step forward in operational safety, unfortunately it incorporate a number of design and mechanical drawbacks which are likely to create serious difficulties in both operation and maintenance. For example, the prior art valve has a single housing containing the valve components as well as the actuator components. This arrangement is prone to seal damage and resulting leakage, because at least some of the actuator components must undergo both rotational movement and axial movement into and out of the housing. The valve is also difficult to connect into standard brake systems, due in large part to its ports being arranged in vertically separated planes. Finally, the prior art valve is unnecessarily heavy, cumbersome and difficult to operate.

The general objective of the present invention is to provide an improved valve and actuator assembly which overcomes the above stated drawbacks.

SUMMARY OF THE INVENTION

A valve and actuator assembly in accordance with the present invention has a valve housing with three ports leading to an interior valve chamber containing a ball element. The ports are adapted for connection respectively to the branch pipe and to the two sections of the brake pipe. The ball element is rotatable within the valve chamber about the axis of an operating stem which protrudes to the exterior of the valve housing. The ball element has communicating passages arranged to communicate with the ports in any one of four different combinations, depending on the rotative displacement of the ball element.

An actuator housing is connected to the valve housing. The actuator housing defines a separate actuator chamber into which the protruding portion of the operating stem is received. A rotatable actuator shaft extends through the actuator chamber in a direction perpendicular to the operating stem. Opposite ends of the actuator shaft protrude through opposite sides of the actuator housing. Gears contained within the actuator chamber provide a driving connection between the actuator shaft and the operating stem. Appropriate handles or other like operating mechanisms are connected at opposite ends of the actuator shaft and are arranged at opposite sides of the railroad car.

Preferably, the ports in the valve housing are all contained in a common plane parallel to the actuator shaft.

The aforesaid gear connection between the actuator shaft and the operating stem is preferably provided by a set of bevel gears, the driving gear being on the actuator shaft and the driven gear being on the operating stem.

The actuator shaft is preferably provided with a locking element which is engageable with a fixed element on the actuator housing to prevent inadvertent rotation of the actuator shaft from a selected position. The actuator shaft is movable axially in opposite directions through both the driving bevel gear and the actuator housing in order to permit engagement and disengagement of the locking element when changing the valve setting. Preferably, the actuator shaft is biased by springs into a position at which the locking element is engaged with the fixed element.

In the preferred embodiment to be hereinafter described in greater detail, the locking element consists of a collar fixed to the actuator shaft at a location within the actuator chamber. The collar is provided with notches adapted to engage a fixed element protruding from the actuator housing inwardly into the actuator chamber.

BRIEF DESCRIPTION OF THE DRAWINGS

An embodiment of the invention will now be described, by way of example only, with reference to the accompanying drawings wherein.

DESCRIPTION OF PREFERRED EMBODIMENT

Figure 1:
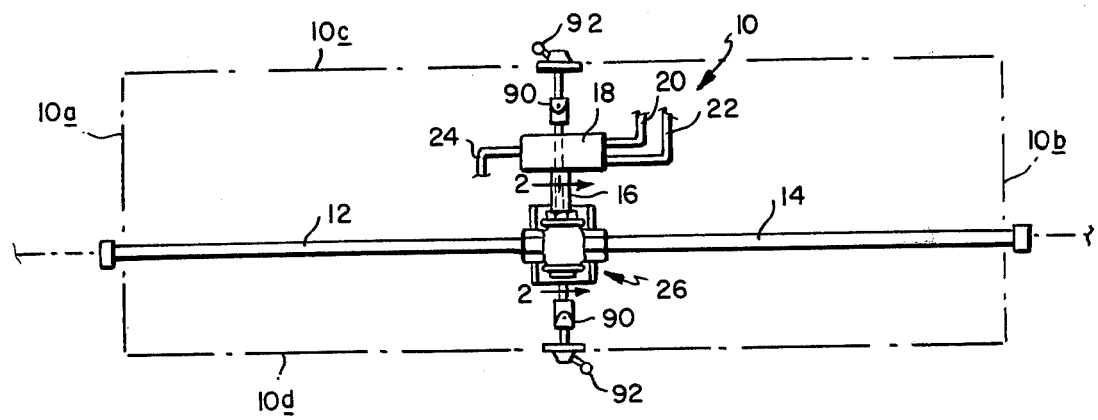
FIG. 1 is a plan view of a valve and actuator assembly in accordance with the present invention.

Referring initially to FIG. 1, a railroad car is shown by dot-dash lines at 10 with opposite ends 10a, 10b and opposite sides 10c, 10d. A portion of the air brake system for the car is shown as including a brake pipe running from one end of the car to the other and consisting of pipe sections 12, 14, with a laterally arranged branch pipe section 16 leading to a control valve 18. The control valve is in turn connected to other components of the brake system, for example by pipes 20 and 22 to a combined auxiliary and emergency compressed air reservoir (not shown), and by pipe 24 to a brake cylinder (also not shown). A valve and actuator assembly in accordance with the present invention is generally depicted at 26 at the junction of pipe sections 12, 14 and 16.

Figure 2:
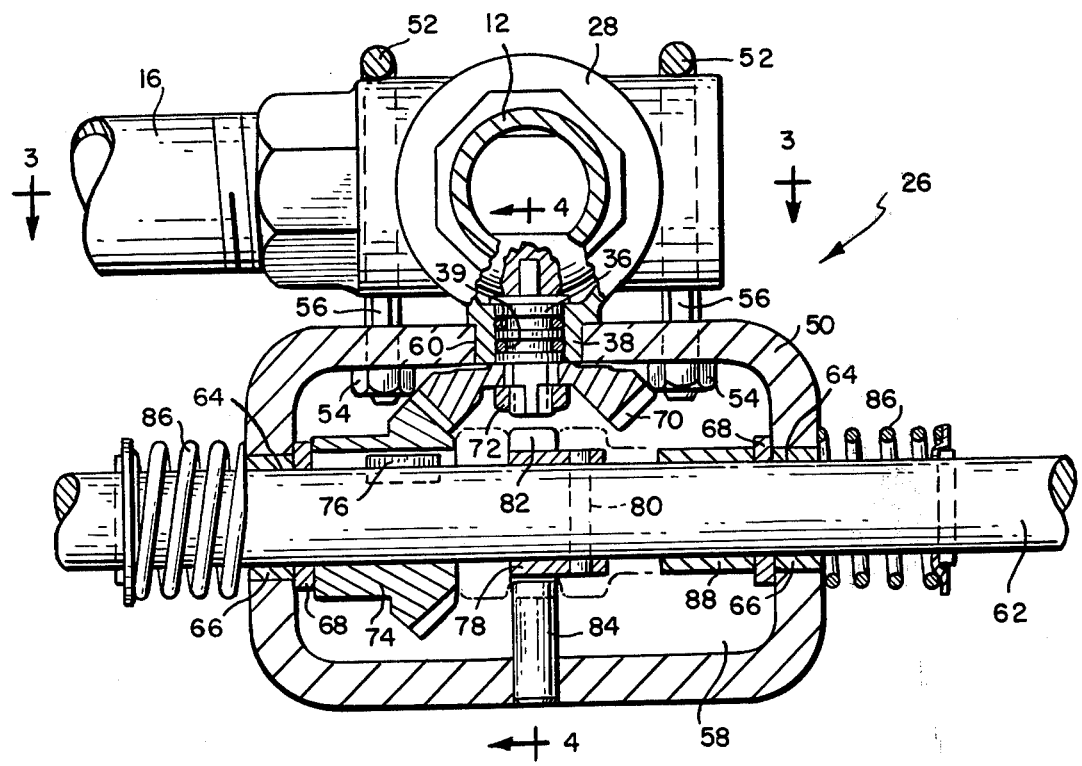
FIG. 2 is a sectional view on an enlarged scale taken along lines 2—2 on FIG. 1.
Figure 4:
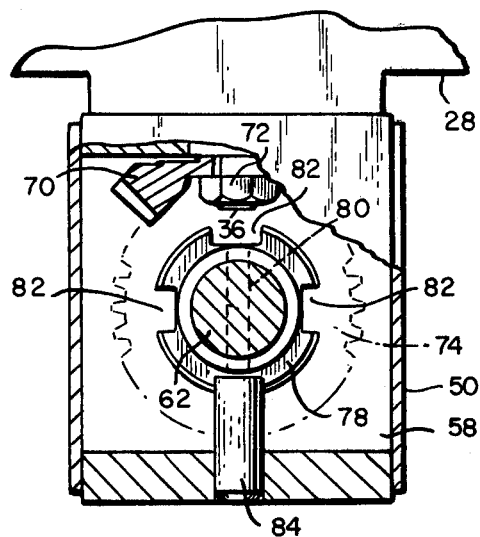
FIGS. 3 and 4 are sectional views taken respectively along lines 3—3 and 4—4 on FIG. 2.
Figure 3:
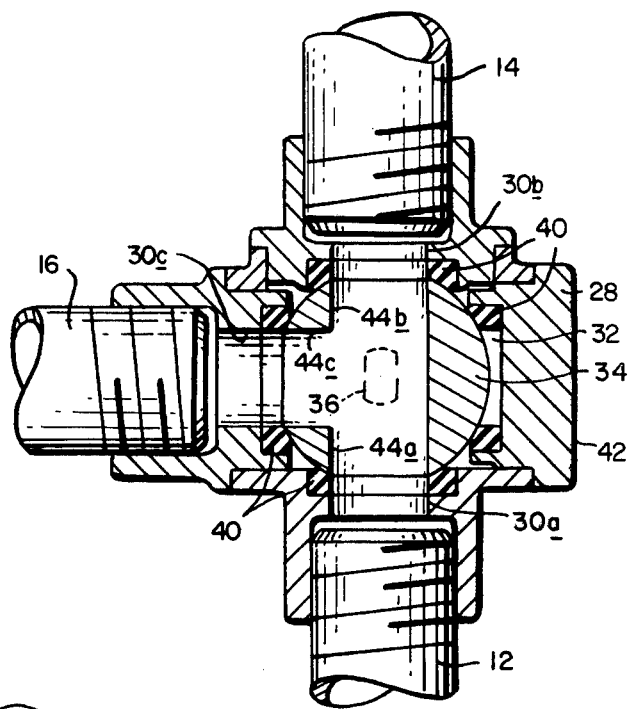

Referring additionally to FIGS. 2–4, the valve and actuator assembly 26 comprises a valve housing 28 having three ports 30a, 30b, and 30c leading to an interior valve chamber 32 containing a ball element 34. The ball element is rotatable within the valve chamber about the axis of an operating stem 36 protruding therefrom through a boss 38 to the exterior of the valve housing. Appropriate seals 39 are provided between the operating stem 36 and the interior of the boss 38. Opposed valve seats 40 are arranged at the ports 30a, 30b, 30c as well as at the plugged side 42 of the valve housing 28 in order to rotatably contain and seal the ball element 34 within the valve chamber 32. The valve ports 30a, 30b and 30c are adapted for connection respectively to the pipe sections 12, 14 and 16. Although threaded connections are illustrated, it will be understood that flange-type connections would be equally acceptable.

The ball element 34 has communicating passages 44a, 44b and 44c arranged to communicate with the ports 30a, 30b and 30c in any one of four different combinations, depending on the rotative displacement of the ball element within the valve housing.

An actuator housing 50 is attached to the valve housing 28 by any convenient means, such as for example U-bolts 52 and nuts 54 with spacers 56 interposed between both housings. The actuator housing 50 defines an actuator chamber 58 which is separate from the valve chamber 32 in valve housing 28. The actuator housing has an aperture 60 which receives the boss 38 on valve housing 28, and which permits the protruding portion of the operating stem 36 to be received in the actuator chamber 58.

A rotatable actuator shaft 62 extends through the actuator chamber 58 in a direction perpendicular to the operating stem 36. Opposite ends of the actuator shaft 62 protrude through openings 64 in opposite sides of the actuator housing 50. Bushings 66 and washers 68 are associated with the openings 64 to provide bearing support for radial and axial loads.

The actuator shaft 62 is drivingly connected to the operating stem 36 by a gear set contained within the actuator chamber 58. Preferably, this gear set consists of a driven bevel gear 70 fixed to the end of the operating stem 36 by a nut 72, and a driving bevel gear 74 on the actuator shaft 62. The actuator shaft 62 is movable axially through both the actuator housing 50 and the driving bevel gear 74. The driving bevel gear 74 is keyed as at 76 to the actuating shaft 62.

A locking collar 78 is fixed to the actuator shaft 62 by means of a pin 80. The collar 78 is provided with four notches 82 which are adapted to engage a fixed element such as for example a pin 84 protruding from the actuator housing 50 inwardly into the actuator chamber 58. The actuator shaft 62 is biased into the locked position shown in FIG. 2 by springs 86. Axial movement of the actuator shaft 62 is limited in one direction (to the left as viewed in FIG. 2) when one end of the collar 78 contacts the driving bevel gear 74, and in the opposite direction when the opposite end of collar 78 contacts a spacer 88.

Figure 5:
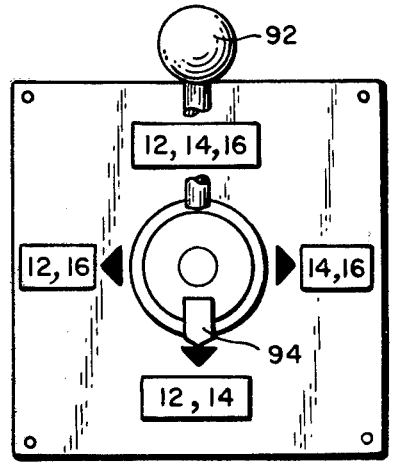
FIG. 5 is an end elevation of one of the operating handwheels.

Referring again to FIG. 1, it will be seen that the opposite ends of the actuator shaft 62 are connected by couplings 90 to rotatable handles 92 located at the opposite sides 10c, 10d of the railroad car 10. As is best shown in FIG. 5, each handle 92 has an indicator 94 which provides the brakemen with a visual indication of the setting of the valve. It will be understood that the handles 92 are directly connected to one another via the actuator shaft 62, and hence movement of one handle will produce corresponding movement of the other handle.

Figure 6:
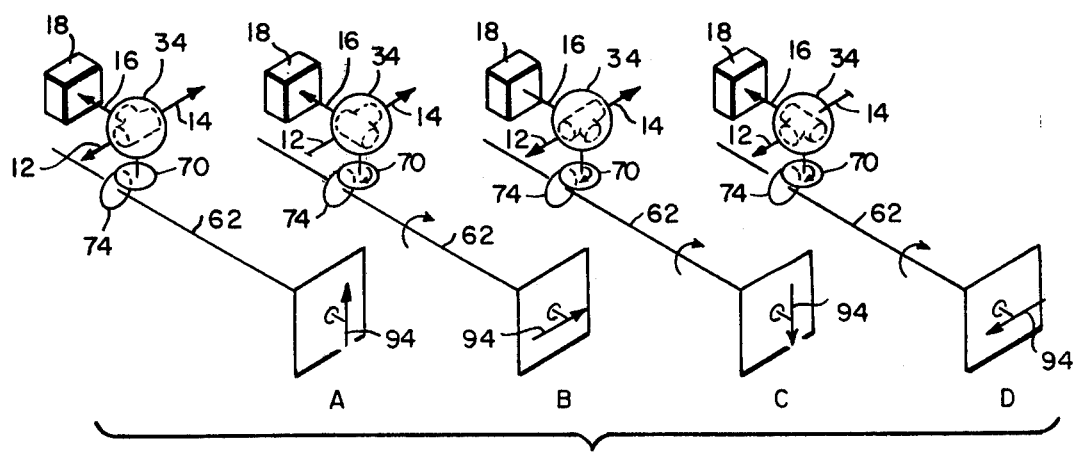
FIG. 6 is a diagrammatic illustration depicting the different valve settings which can be achieved with the valve and actuator assembly of the present invention.

The operation of the valve and actuator assembly of the present invention will now be explained with further reference to FIG. 6. With the indicator 94 in the position shown in FIG. 6A, the ball element 34 is rotated to a position such that the pipe sections 12, 14 and 16 are all in communication with each other. In order to change the valve setting to the condition shown in FIG. 6B, a brakeman on either side of the car will grasp one of the operating handles 92 and initially shift it and the actuator shaft 62 axially to disengage the locking collar 78 from the pin 84. Thereafter, the actuating shaft 62 will be rotated through 90° increments. This rotation will be transmitted to the operating stem 36 via the intermeshed bevel gears 74, 70 with the result that the ball element 34 will be rotated to close off pipe section 12 while permitting pipe sections 14 and 16 to remain in communication. Once this setting has been achieved, the operating handle 92 is released and the springs 86 bias the actuating shaft 62 back to the position shown in FIG. 2, with one of the notches 82 on the collar 78 in locked engagement with the pin 84.

FIGS. 6C and 6D depict further possible settings. In FIG. 6C, the pipe sections 12 and 14 are in communication with the pipe section 16 being isolated. In FIG. 6D, the pipe sections 12 and 16 are in communication and the pipe section 14 is isolated.

In light of the foregoing, it will now be appreciated by those skilled in the art that the valve and actuator assembly of the present invention provides a number of significant advantages. For example, by providing separate valve and actuator housings 28, 50, either can be replaced or modified independently of the other. This is advantageous from a maintenance standpoint. Also, by providing an actuator chamber 58 which is separate from the valve chamber 32, contamination of the latter by dirt, grit, water, etc. is effectively minimized. In other words, the task of sealing the valve chamber 32 is simplified considerably by locating the actuator shaft 62 and its associated gearing in a separate actuator housing.

It will also be seen that the valve ports 30a, 30b and 30c are located in a plane which is parallel to the actuator shaft 62. This arrangement permits the valve housing 28 to be arranged horizontally beneath the car, with the pipe sections 12, 14 and 16 being arranged in a common horizontal plane, which can simplify the overall piping arrangement by eliminating some elbows, bends, etc.

Finally, the valve and actuator assembly of the present invention is both compact and lightweight, without sacrificing sturdiness and reliability.

I claim:

1. For use in an air brake system for a railroad car having at least three pipe sections for carrying compressed air, a valve and actuator assembly manually operable from opposite sides of the car for selectively interconnecting said pipe sections, comprising:

a valve housing having three ports leading to an interior valve chamber containing a ball element, said ports being adapted for connection to said pipe sections, said ball element being rotatable within said valve chamber about the axis of an operating stem protruding therefrom through said valve housing to the exterior thereof, said ball element having communicating passages arranged to communicate with said ports in any one of four different combinations depending on the rotative displacement of said ball element;
an actuator housing attached to said valve housing and defining an actuator chamber separate from said valve chamber, said actuator housing having an aperture through which the protruding portion of said operating stem is received into said actuator chamber,
a rotatable actuator shaft extending through said actuator chamber in a direction perpendicular to said operating stem, with opposite ends of said actuator shaft protruding through opposite sides of said actuator housing;
gear means contained within said actuator chamber for drivingly connecting said operating stem;
operating means for rotatably setting said ball element by rotating said actuator shaft from either side of the railroad car; and
disengageable locking means for resisting inadvertent rotation of said actuator shaft from a selected setting.

2. The valve and actuator assembly of claim 1 wherein the ports in said valve housing are all contained in a common plane parallel to said actuator shaft.

3. The valve and actuator assembly of claim 1 wherein said gear means consists of a driving bevel gear on said actuator shaft in meshed relationship with a driven bevel gear on said operating stem.

4. The valve and actuator assembly of claim 3 wherein said locking means is carried on said actuator shaft and is engageable with fixed means on said actuator housing, said actuator shaft being movable axially in opposite directions through both said driving bevel gear and said actuator housing in order to allow for engagement and disengagement of said locking means.

5. The valve and actuator assembly of claim 4 further comprising spring means for biasing said actuator shaft into a position at which said locking means is engaged with said fixed means.

6. The valve and actuator assembly of claim 4 or 5 wherein said locking means consists of a collar fixed to said actuator shaft at a location within said actuator chamber, wherein said fixed means consists of a stationary element protruding from said actuator housing into said actuator chamber, and wherein said collar is provided with notches adapted to engage said fixed element.

7. The valve and actuator assembly of claim 1 further comprising position indicator means associated with said operating means at opposite sides of the railroad car for providing a visual indication of the setting of said ball element.

* * * * *